United States Patent
Koay et al.

(10) Patent No.: US 7,243,309 B2
(45) Date of Patent: Jul. 10, 2007

(54) INTERFACE ACCELERATOR

(75) Inventors: Choon Wee Koay, Georgetown (MY); Siew Beng Thum, Penang (MY)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 10/309,462

(22) Filed: Dec. 3, 2002

(65) Prior Publication Data

US 2004/0104944 A1 Jun. 3, 2004

(51) Int. Cl.
*G06F 3/00* (2006.01)
(52) U.S. Cl. ...................... 715/827; 715/760
(58) Field of Classification Search ............... 715/827, 715/825, 760
See application file for complete search history.

(56) References Cited

U.S. PATENT DOCUMENTS

| | | | | |
|---|---|---|---|---|
| 5,525,978 A * | 6/1996 | York et al. | 341/22 |
| 5,721,850 A * | 2/1998 | Farry et al. | 715/700 |
| 5,796,404 A * | 8/1998 | Gentner | 715/823 |
| 5,916,310 A * | 6/1999 | McCain | 710/67 |
| 5,973,688 A * | 10/1999 | May | 715/709 |
| 6,078,323 A * | 6/2000 | Gest | 715/711 |
| 6,114,978 A * | 9/2000 | Hoag | 341/23 |
| 6,181,344 B1 * | 1/2001 | Tarpenning et al. | 715/863 |
| 6,489,976 B1 * | 12/2002 | Patil et al. | 715/827 |
| 6,724,399 B1 * | 4/2004 | Katchour et al. | 715/740 |
| 6,968,537 B2 * | 11/2005 | Abdelhadi et al. | 717/106 |
| 2003/0234822 A1 * | 12/2003 | Spisak | 345/827 |
| 2004/0075696 A1 * | 4/2004 | Koch et al. | 345/827 |

* cited by examiner

*Primary Examiner*—Sy D. Luu
(74) *Attorney, Agent, or Firm*—Joni D. Stutman-Horn

(57) ABSTRACT

To facilitate interface navigation, accelerator keys are assigned to links within the interface. If the interface is a web browser, for example, accelerator keys may be associated with link elements, e.g., URLs, images, objects, scripts, etc., linking to a resource. Link indicators may be displayed to visually indicate the accelerator keys. If there are more links elements than accelerator keys, the accelerator keys may be shifted to other links, such as through activation of a shifting key.

26 Claims, 4 Drawing Sheets ent in which:
INTERFACE ACCELERATOR

FIELD OF THE INVENTION

The invention generally relates to providing accelerator keys to facilitate selecting portions of a user interface, and more particularly to assigning accelerator keys to links displayed within a network application program such as a browser.

BACKGROUND

With the popularity of networks, network application programs such as graphical browsers, e.g. Microsoft Internet Explorer and the like, have become a common interface for accessing network resources. Typically, a web page or equivalent data construct is loaded from a network by the browser, and the web page contains data and links to resources obtainable over one or more networks, e.g., intranets, the Internet, wide area networks (WANs), local area networks (LANs), etc.

Unfortunately, graphical browsers are typically limited in the ways in which they can receive input to indicate a selection of a link to a resource in the web page. Generally, a graphical browser can only be directed to a new resource by using a mouse to select a link, or by using keystrokes to move an input focus to the address bar of the browser so that an address can be manually (and generally tediously) entered. Requiring clicking on a link can be inconvenient for people having certain disabilities, as well as for people in restricted environments in which a mouse cannot be utilized. In some graphical browsers, one can use the tab key to single-step through all link of a web page, and then select a particular link by pressing the "enter" key.

In a non-graphical context, a browser called "Lynx" (developed by the Distributed Computing Group within Academic Computing Services of The University of Kansas), and typically used by way of a text terminal in Unix-type operating systems, e.g., Unix, Linux, etc., may be used to text-view graphical web pages. Since many links within a web page are graphical and inaccessible to Lynx, Lynx may be used to generate a new web page containing enumerated links for elements that would have been selectable in a web page being viewed, had a typical graphical-view and mouse been available. Unfortunately, this page of enumerated links is inconvenient as the numbered links are provided out of the context of the web page.

BRIEF DESCRIPTION OF THE DRAWINGS

The features and advantages of the present invention will become apparent from the following detailed description of the present invention in which.

DETAILED DESCRIPTION

There is a need for a browser allowing in-context enumeration of link element in a web page, and assignment of accelerator keys to link elements of the web page, even though there may be fewer accelerator keys available than there are link elements on the web page. For expository convenience herein, discussion assumes use of web browsers and web pages. It will be appreciated, however, that the following description applies to any network application program that manipulates data that may contain links to other resources on public and/or private networks. Web browsers are discussed herein for expository convenience as such browsers are well understood.

In one embodiment, to allow a keyboard to be used to navigate web pages presented in a web browser, accelerator keys are dynamically assigned to URLs and other browser controls, e.g., hyperlinks, picture links (such as pictures surrounded by "A HREF" tags or equivalent), image maps, image links, buttons, Java scripts, ASP scripts, and any other construct that may be selected and result in the browser navigating to some local or remote resource. In the following description and claims that follow, the phrase "link elements" will be used to generally refer to all such ways to link to a resource. Accelerator keys are displayed proximate to a link element to which it is assigned. A user is able to navigate to a resource identified by a link element by depressing the accelerator key or keys (e.g., a modifier key such as ALT, CTRL, back-quote, tilde, etc. may be required) associated with a desired link element.

Figure 1:
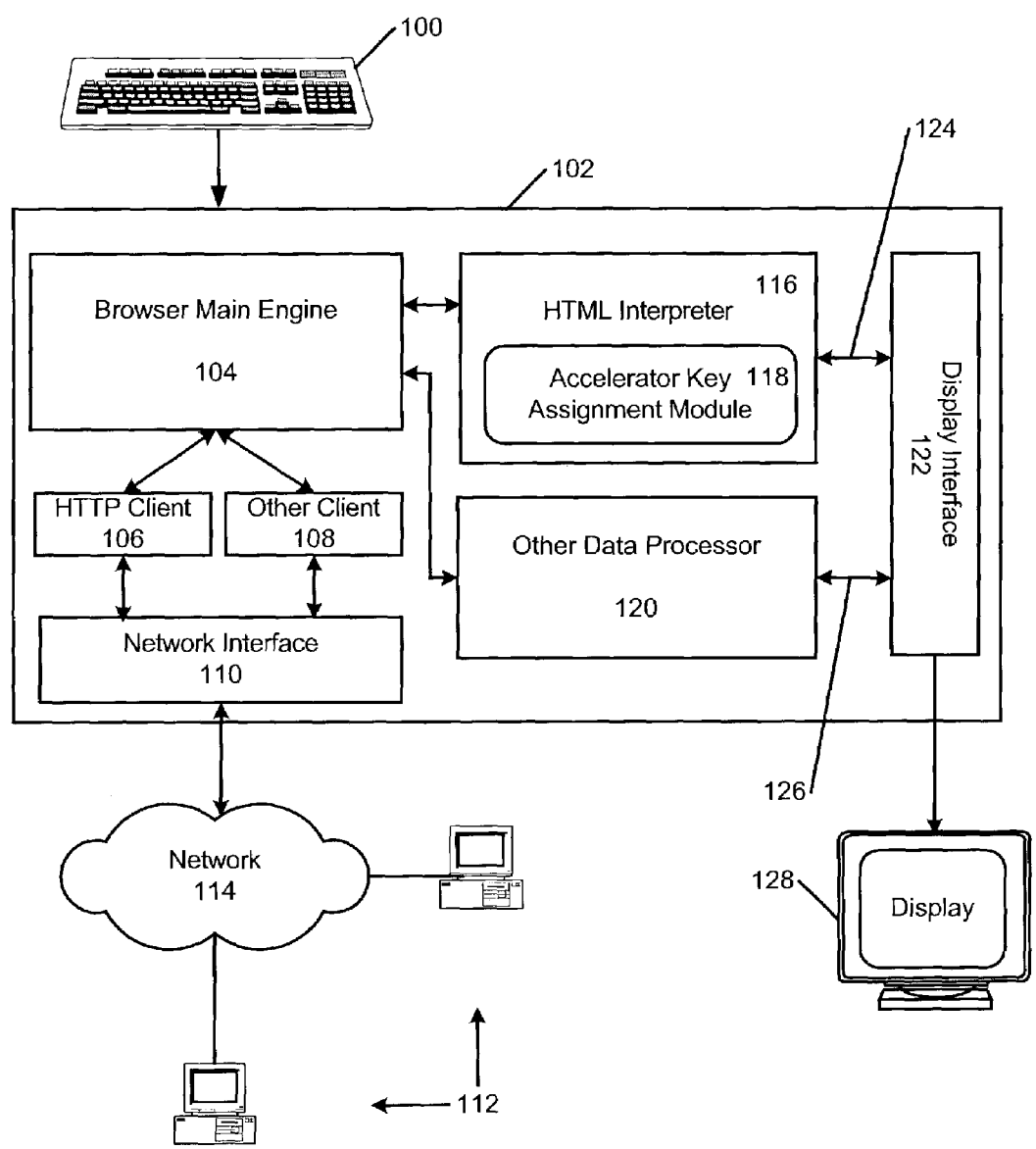
FIG. 1 illustrates a system according to one embodiment in which link elements can be accessed via assigned accelerator keys.

FIG. 1 illustrates a system according to one embodiment in which link elements, e.g., hyperlinks, can be accessed via assigned accelerator keys. A keyboard 100 is communicatively coupled with a device 102. See FIG. 4 for a discussion of a suitable computing environment that may embody the keyboard 100 and device 102. The keyboard may be wired to the device 102 in a conventional fashion, or it may be wirelessly coupled thereto. The keyboard is used to provide input to a browser main engine 104, or "central controller," of a browser operating within the device 102, where the main engine is responsible for managing operation of the browser, including receiving and processing events indicating activity by a user of the browser.

Browser components may include a HyperText Transport Protocol (HTTP) client 106 or other protocol client 108 that uses a network interface 110 or other communication medium to communicate with other devices 112 over a network 114. The protocol clients 106, 108 may retrieve data, such as a web page or other data that is processed by an appropriate interpreter, such as a HyperText Markup Language (HTML) interpreter 116 or an other processor 120 as appropriate to the data retrieved from the other machines 112. That is, the other processor 120 may be a processor for animation data, such as a Macromedia Shockwave file. In the illustrated embodiment, the HTML interpreter 116 contains an Accelerator Key assignment module 118.

In one embodiment, the assignment module is a subclassed layer of the HTML interpreter, and configured so that the assignment module is called before the HTML interpreter interprets HTML data to allow the assignment module to inspect and modify HTML data to include link indicators for accelerator keys prior to the HTML being interpreted. In one embodiment, the assignment module is subclassed off the browser window class, and all link elements are identified for a displayed document only. That is, to conserve system resources and increase responsiveness, in this embodiment, accelerator keys are only assigned to an active html document. Pages in a browser history cache may optionally be processed when accessed.

It will be appreciated that various programming techniques, including the illustrated embodiment's subclass technique, may be employed to incorporate the assignment module into a browser such that it may operate to transcode HTML or other data to include link indicators. For example, an alternate implementation is to implement the invention as a browser plug-in module installed to process received data.

Interpreted or otherwise processed output 124, 126 from the HTML interpreter 116 and/or other data processor 120 may be provided to a display interface 122, e.g., an Application Program Interface (API), driver, etc. communicatively coupled with an output device 128, such as a computer monitor or other output device or medium. The interface is typically a component of an operating system (not illustrated) in which the browser components 104–110, 116–120 operate. However, the interface may be incorporated into a browser, or may operate to convert output 124, 126 into a secondary format suitable for processing by an operating system display driver (not illustrated) or equivalent.

Figure 2:
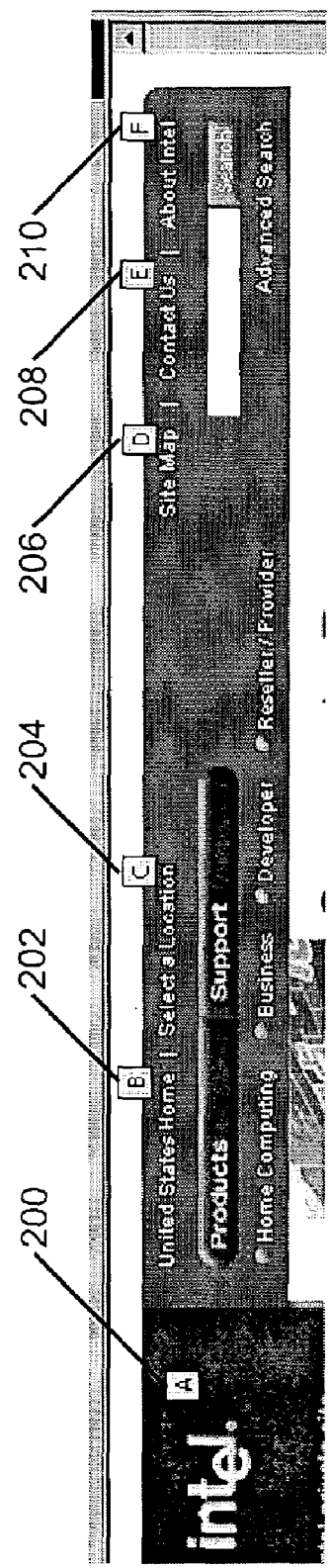
FIG. 2 illustrates a web page fragment in which link elements have been activated for an exemplary web page.

FIG. 2 illustrates a web page fragment in which link elements have been activated for an exemplary web page. In the illustrated embodiment, six accelerator keys are available, denoted with the letters "A" through "F". In one embodiment, the Accelerator Key Assignment Module 118 may be selectively activated, and when activated, results in the data corresponding to the exemplary web page, e.g., its HTML code, being searched for link elements. In one embodiment, on activation of the assignment module, code to cause display of link indicators 200–210 is inserted into the code for the exemplary web page so that its interpretation by an appropriate interpreter, e.g., 116, 120, results in display of the link indicators.

When there are more link elements in a web page than there are available accelerator keys, a special keystroke or other event may be used to indicate that accelerator keys should be shifted to different link elements of a web page being displayed. For example, the tilde key "~" may be used to trigger a shift of the accelerator keys to different link elements. However, it will be appreciated that non-key events may also be used to trigger the shift. For example, moving a view on a web page, such as by scrolling the web page, may trigger accelerator key shift so that link indicators remaining in view on the web page are assigned accelerator keys.

In one embodiment, when there are more link elements than accelerator keys, a link indicator may be configured to indicate a link element that has been identified, even if no accelerator key is assigned. For example, the first link indicator 200 may be a box containing an assigned accelerator key, as illustrated, or be displayed as an empty box to signify the link element has been recognized, but no accelerator key is presently assigned.

Figure 3:
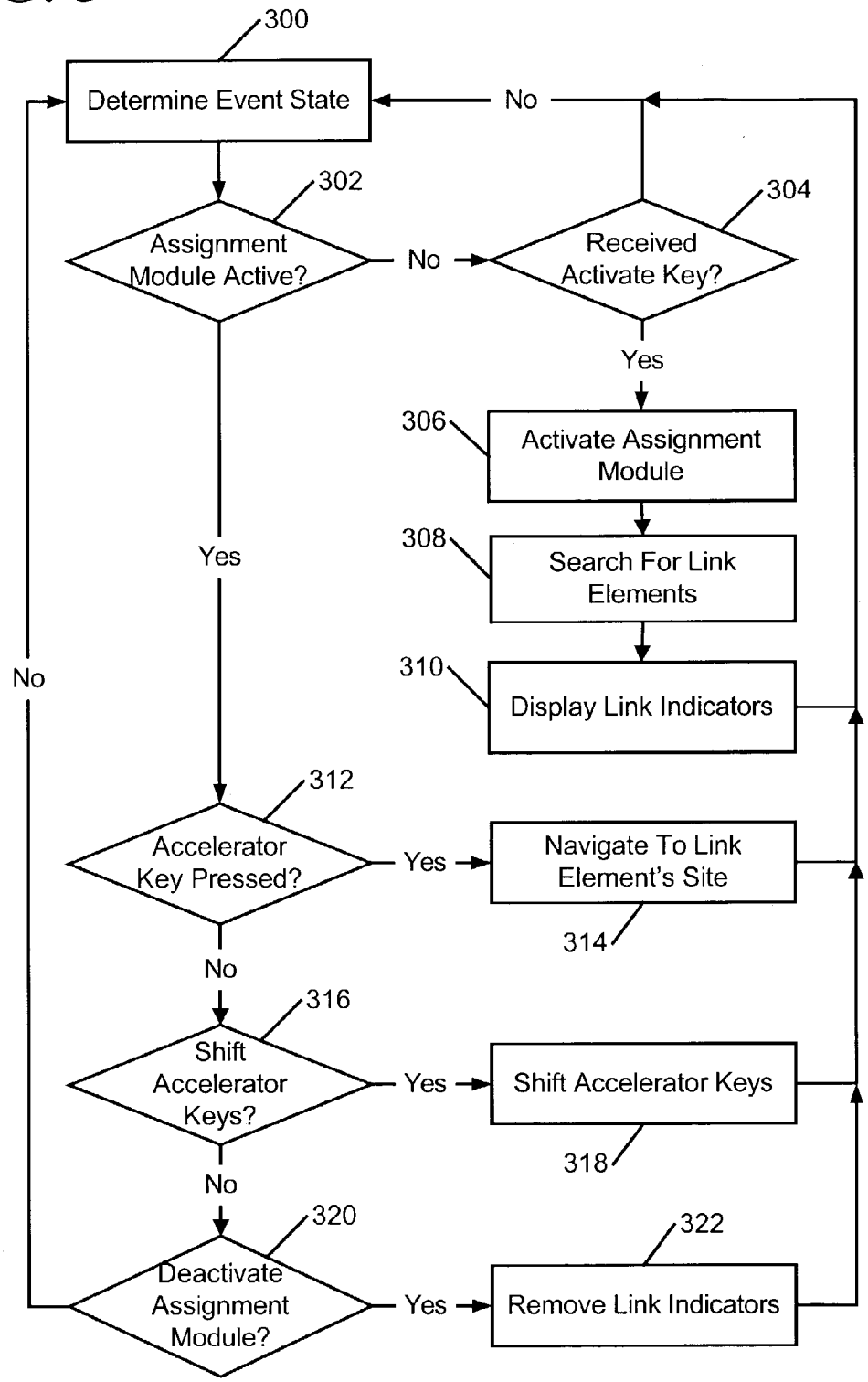
FIG. 3 illustrates a flowchart according to one embodiment.

FIG. 3 illustrates a flowchart according to one embodiment. In the illustrated embodiment, it is assumed a browser follows a conventional event model structure in which events are generated based on activity within the browser, e.g., navigating, activating toolbar buttons, key presses, etc., result in events being generated that may be received and processed by modules within the browser, and that the Accelerator Key Assignment Module 118 is installed within the browser and is listening, e.g., receiving, all events generated within the browser.

An event state is determined 300, such as a state resulting from receiving an event such as a key press event or other event, and a test is performed to determine if 302 the assignment module is active. If not, a test may be performed to determine if 304 an activation event, e.g., a key press event for the activation key, has been received. If so, then assignment module is activated 306 and the code for the current web page is searched 308 for link elements, and link indicators are displayed 310 proximate to the link elements. Proximate placement depends on the nature of the link element. For example, in one embodiment, for an image map, link indicators may be overlaid on the different image regions, whereas for traditional hyperlinks in a text-base web page, link indicators may be placed in-text adjacent to the hyperlink. It will be appreciated the disclosed techniques are applicable to current as well as future link element definition techniques of future programming environments. Regardless of how a web page is encoded, its encoding may be searched and modified to include accelerator keys.

If 302 the assignment module was active, a test is performed to determine if 312 an accelerator key was activated, e.g., a key press occurred. For example, in one embodiment, if the assignment module is active, then any key press is interpreted to be an accelerator key (if in range of assigned keys). When a key press event is received, a table, database, or other construct storing associations between accelerator keys and the link elements, is searched, and if a match is found, a navigation event is generated to direct the browser to navigate 314 to the accelerator key's associated link element. For example, a "click" event may be generated to simulate a user clicking on a particular link element, and the browser will intercept the event message and proceed normally as if a user had physically clicked the link element.

If 312 an accelerator key had not been activated, a check is performed to determine if 316 a shift request was received, e.g., a special key stroke or other event indicative of a need or desire to shift the accelerator keys. If so, the link indicators are shifted 318. As will be appreciated, different embodiments may employ various approaches to determining how to shift the link indicators. For example, assuming there are x available accelerator keys, a direct approach would be to enumerate link elements for a web page in a left-to-right, top-to-bottom fashion, and simply assign accelerator keys to the first x page link elements, and when shifting, assigning the next x link elements, and so on, until all link elements have been assigned. Alternatively, web page structure may be taken into account. For example, links may be assigned with respect to identified page regions, e.g., columns, table cells, page frames, etc., since regions likely indicate a relationship between link elements in the page region and therefore it is desirable to allow one to quickly select among the related link elements. The request to shift can result in the link indicators being shifted to another page region.

If 316 a shift request was not received, than a test may be performed to determine if 320 a deactivation request has been received. If so, then the link indicators are removed 322 from the presently viewed web page. In one embodiment, removal includes searching through the code for the current web page and removing the added code for the link indicators. In another embodiment, the original code for the web page is stored before being modified to display 310 link indicators, and the original code is used to replace the modified code. In yet another embodiment, if searching 308 for link elements is time consuming, the code responsible for displaying the link indicators is commented out or otherwise flagged as inactive, rather than being removed, so that the comments can be easily removed to restore the link indicators without have to repeat the search for them.

In the illustrated embodiment, after processing received events, the assignment module 118 loops back to waiting to receive 300 another event. However, it will be appreciated that other tasks, not illustrated, may be performed before continuing to listen for further events.

Figure 4:
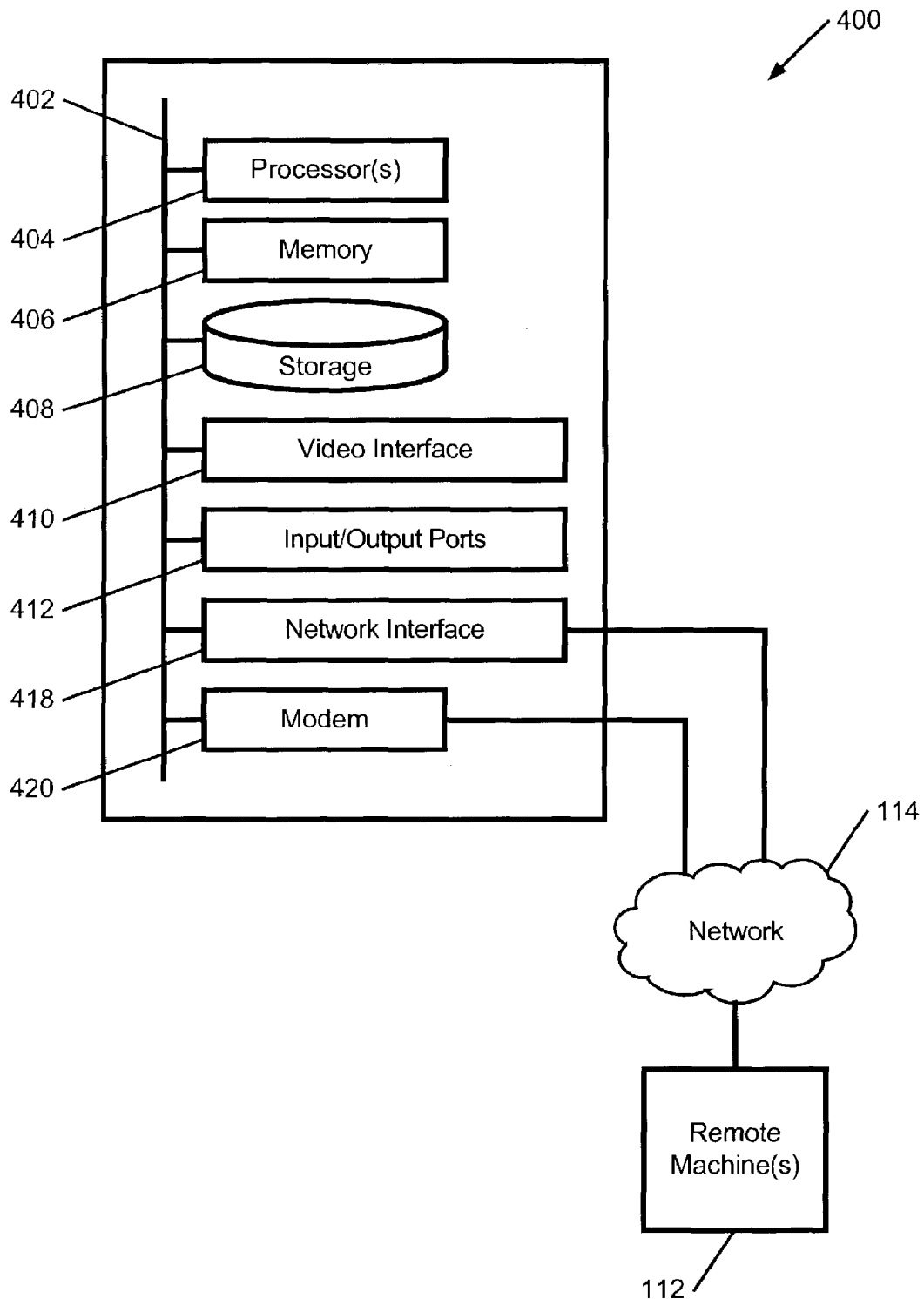
FIG. 4 illustrates a suitable computing environment in which certain aspects of the invention may be implemented.

FIG. 4 and the following discussion are intended to provide a brief, general description of a suitable environment, which may include the FIG. 1 system, in which certain aspects of the illustrated invention may be implemented. As used herein, the term "machine" includes a single machine, such as a computer, e.g., personal computer, server, workstation, portable computers, a handheld device, e.g., Personal Digital Assistant (PDA), telephone, tablets, etc., a transportation device, e.g., an automobile, public transportation, etc., or a system of communicatively coupled machines or devices.

Typically, a machine 400 includes a system bus 402 to which is attached processors 404, a memory 406, e.g., random access memory (RAM), read-only memory (ROM), or other state preserving medium, storage devices 408, a video interface 410 (which may incorporate display interface 122) for controlling display 128, and input/output interface ports 412. The machine may be controlled, at least in part, by input from conventional input devices, such as a keyboard 100, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 112, such as through a network interface 418, modem 420, or other communicative coupling. Machines may be interconnected by way of a physical and/or logical network, such as the network 114 of FIG. 1, and the network may include an intranet, the Internet, local area networks, wide area networks, and the like. One skilled in the art will appreciated that communication with network 114 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 406, or in storage devices 408 and their associated storage media, including hard-drives, floppy-disks, optical storage, tapes, flash memory, memory sticks, digital video disks, biological storage, etc. Associated data may be delivered over transmission environments, including network 114, in the form of packets, serial data, parallel data, propagated signals, etc., and may be used in a compressed or encrypted format. Associated data may be used in a distributed environment, and stored locally and/or remotely for access by single or multi-processor machines, Thus, for example, with respect to the illustrated embodiments, assuming machine 400 embodies the device 102 of FIG. 1, then a remote machine 112 may be a web server providing web page content that is modified to display link indicators before the web page content is displayed on the display 128. It will be appreciated that the remote machine 112 may be configured like machine 400, and therefore include many or all of the elements discussed for the machine.

Since there currently is no built-in system or standard to allow a web page designed to specify placement of accelerator indicators, and corresponding assignment of accelerator keys, illustrated embodiments thus facilitate web page navigation in a fashion not presently available. This is advantageous, for example, for people with certain disabilities that render them unable to easily select link elements.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. In a browser, a method comprising:
   inspecting a web page for a first link element linking to a first resource;
   associating an accelerator key with the first link element;
   modifying an original code for the web page to include new code for directing the browser to display a first link indicator; and
   displaying the web page with the first link indicator identifying the accelerator key.

2. The method of claim 1, wherein the browser is an Internet browser, the method further comprising:
   directing the browser to navigate to the first resource.

3. The method of claim 1, further comprising:
   determining the accelerator key has been activated; and
   directing the browser to navigate to the first resource responsive to determining the accelerator key has been activated.

4. The method of claim 3, wherein the browser implements an event model, and wherein a press of the accelerator key results in a key press event indicating activation of the accelerator key.

5. The method of claim 1, further comprising:
   receiving a key press event corresponding to the accelerator key; and
   simulating a selection of the first link element with a mouse responsive to a key press event.

6. The method of claim 1, further comprising:
   toggling display of accelerator keys within the web page.

7. The method of claim 1, further comprising:
   receiving a request to stop displaying link indicators within the web page; and
   responsive to the request, directing the browser to display the original code.

8. The method of claim 1, further comprising:
   assigning accelerator keys based at least in part on the layout of the web page.

9. In a browser, a method comprising:
inspecting a web page for a first link element linking to a first resource;
associating an accelerator key with the first link element;
displaying the web page with a first link indicator identifying the accelerator key; and displaying link indicator placeholders in the web page if there are more link elements in the web page than are available accelerator keys to assign thereto.

10. In a browser, a method comprising:
inspecting a web page for a first link element linking to a first resource;
associating an accelerator key with the first link element;
displaying the web page with a first link indicator identifying the accelerator key;
receiving a request to shift accelerator keys;
disassociating the accelerator key from the first link element; and
associating the accelerator key with a second link element of the web page.

11. An article comprising a machine-accessible media having associated data, wherein the data, when accessed, results in a browser performing:
inspecting a web page for a first link element linking to a first resource;
associating an accelerator key with the first link element;
modifying an original code for the web page to include new code for directing the browser to display a first link indicator; and
displaying the web page with a the first link indicator identifying the accelerator key.

12. The article of claim 11 wherein the machine-accessible media further includes data, when accessed, results in the machine performing:
determining the accelerator key has been activated; and
directing the browser to navigate to the first resource responsive to determining the accelerator key has been activated.

13. The article of claim 11 wherein the machine-accessible media further includes data, when accessed, results in the machine performing:
assigning accelerator keys based at least in part on the layout of the web page.

14. An article comprising a machine-accessible media having associated data, wherein the data, when accessed, results in a browser performing:
inspecting a web page for a first link element linking to a first resource;
associating an accelerator key with the first link element; and
displaying the web page with a first link indicator identifying the accelerator key; and displaying link indicator placeholders in the web page if there are more link elements in the web page than are available accelerator keys to assign thereto.

15. An article comprising a machine-accessible media having associated data, wherein the data, when accessed, results in a browser performing:
inspecting a web page for a first link element linking to a first resource;
associating an accelerator key with the first link element; and
displaying the web page with a first link indicator identifying the accelerator key;
receiving a request to shift accelerator keys;
disassociating the accelerator key from the first link element; and
associating the accelerator key with a second link element of the web page.

16. A system for simulating an action of a mouse, comprising:
a keyboard;
a memory storing instructions for operating a browser, the browser configured to perform inspecting a web page for a first link element linking to a first resource,
associating an accelerator key with the first link element, modifying an original code for the web page to include new code for directing the
browser to display a first link indicator, displaying the web page with the first link indicator identifying the accelerator key,
monitoring for a key press event of the keyboard, and
simulating, responsive to the key press event, a selection of the first link element with the mouse.

17. The system of claim 16, wherein the system is disposed within a portable device.

18. The system of claim 16, further comprising a display for displaying the web page.

19. The system of claim 16, further comprising an assignment module to inspect the web page for the first link element and to modify the original code to include new code to display the first link indicator.

20. The system of claim 19, wherein a hypertext markup language (HTML) interpreter is to display the web page after being modified by the assignment module.

21. In a browser, a method comprising:
identifying at least one link element in a hypertext markup language (HTML) document, wherein the at least one link element is associated with a resource;
associating an accelerator key with each of the at least one link elements, each link element to be associated with a different accelerator key;
modifying the HTML document to include new code for directing the browser to display at least one link indicator, each link indicator being associated with one of the at least one link elements; and
displaying the modified web page with the at least one link indicator identifying the associated accelerator keys.

22. The method as recited in claim 21, further comprising:
determining that one of the accelerator key has been activated; and
directing the browser to navigate to the resource associated with the activated accelerator key responsive to determining the accelerator key has been activated.

23. The method as recited in claim 21, further comprising:
displaying link indicator placeholders in modified HTML document if there are more link elements in the web page than are available accelerator keys to assign thereto.

24. A system for generating graphical displays on a display monitor to be navigated with a keyboard, comprising:
a keyboard communicatively coupled to a processor, wherein at least one key combination on the keyboard is associated as an accelerator key;
the processor to execute an accelerator module to identify at least one link element associated with a network resource in a network application program,
to associate an accelerator key with one of the at least one link elements, and
to modify the network application program to include new code for directing a display module to display at least one link indicator, each link indicator being associated with one of the at least one link elements; and the display module to display the modified network application program on the display monitor with the at least one link indicator identifying the associated accelerator keys.

25. The system as recited in claim 24, wherein when the accelerator module receives a request to stop displaying link indicators within the network application program, the accelerator module is to direct the display module to display the unmodified network application program.

26. The system as recited in claim 24, wherein the accelerator module is to generate link indicator placeholders in the network application program if there are more link elements in the network application program than are available accelerator keys to assign thereto.

* * * * *